United States Patent
Nylander et al.

(10) Patent No.: US 11,220,414 B2
(45) Date of Patent: Jan. 11, 2022

(54) STABILIZER LEG ARRANGEMENT AND METHOD FOR DETECTING WHETHER OR NOT A STABILIZER LEG IS IN SUPPORTING CONTACT WITH THE GROUND

(71) Applicant: Cargotec Patenter AB, Ljungby (SE)

(72) Inventors: Erik Nylander, Hudiksvall (SE); Mats Lindström, Forsa (SE); Lars Rydahl, Hudiksvall (SE)

(73) Assignee: Hiab AB, Kista (SE)

( * ) Notice: Subject to any disclaimer, the term of this patent is extended or adjusted under 35 U.S.C. 154(b) by 136 days.

(21) Appl. No.: 16/722,493

(22) Filed: Dec. 20, 2019

(65) Prior Publication Data

US 2020/0198944 A1 Jun. 25, 2020

(30) Foreign Application Priority Data

Dec. 21, 2018 (EP) ..................................... 18215361

(51) Int. Cl.
*B66C 23/80* (2006.01)
*B60S 9/12* (2006.01)
*F15B 15/16* (2006.01)

(52) U.S. Cl.
CPC ................ *B66C 23/80* (2013.01); *B60S 9/12* (2013.01); *F15B 15/16* (2013.01)

(58) Field of Classification Search
CPC ............. B66C 23/80; B60S 9/12; F15B 15/16
See application file for complete search history.

(56) References Cited

U.S. PATENT DOCUMENTS

| 5,258,913 | A * | 11/1993 | Baldauf | B66C 23/80 701/37 |
| 10,442,665 | B2 * | 10/2019 | Wimmer | B60S 9/12 |
| 2004/0119597 | A1 * | 6/2004 | Petzold | B66C 23/78 340/679 |
| 2011/0062695 | A1 * | 3/2011 | Bergemann | B66C 23/905 280/763.1 |
| 2014/0339187 | A1 * | 11/2014 | Wimmer | B60S 9/12 212/304 |

FOREIGN PATENT DOCUMENTS

| CN | 107 697 820 A | 2/2018 |
| EP | 3 096 119 A1 | 11/2016 |
| WO | 2013/120118 A1 | 8/2013 |

* cited by examiner

Primary Examiner — Michael R Mansen
Assistant Examiner — Juan J Campos, Jr.
(74) Attorney, Agent, or Firm — Dilworth & Barrese, LLP

(57) ABSTRACT

A stabilizer leg arrangement with a stabilizer leg (25), which is extensible by a hydraulic cylinder (27) into a supporting position in contact with the ground. A piston (32) divides the internal space of the hydraulic cylinder into first and second chambers (34, 35), wherein these chambers are configured to come into fluid communication with each other through a flow channel (41) in the hydraulic cylinder when the piston reaches an advanced end position and abuts against a stop surface. An electronic control device (72) is configured to establish information as to whether or not the stabilizer leg is in the supporting position while taking into account a measuring value (V1) related to the hydraulic pressure in the first chamber (34). The invention also relates to a corresponding method and a mobile working machine comprising such a stabilizer leg arrangement.

20 Claims, 9 Drawing Sheets

STABILIZER LEG ARRANGEMENT AND METHOD FOR DETECTING WHETHER OR NOT A STABILIZER LEG IS IN SUPPORTING CONTACT WITH THE GROUND

FIELD OF THE INVENTION AND PRIOR ART

The present invention relates to a stabilizer leg arrangement according to the description herein for supporting a mobile working machine against the ground. The invention also relates to a mobile working machine comprising such a stabilizer leg arrangement. Furthermore, the invention relates to a method for detecting whether or not a stabilizer leg is in supporting contact with the ground.

A mobile working machine equipped with a load handling crane, such as for instance a lorry having a hydraulic loader crane mounted on its chassis, is often provided with hydraulically actuated stabilizer legs for supporting the mobile working machine against the ground to thereby improve the stability of the mobile working machine against tipping. Such a mobile working machine may be provided with means for detecting whether or not a stabilizer leg has reached an active supporting position in supporting contact with the ground.

The differential pressure in a hydraulic cylinder is defined as the hydraulic pressure on the piston side of the hydraulic cylinder minus the hydraulic pressure on the piston rod side of the hydraulic cylinder divided by the cylinder ratio, i.e. $P_{diff} = P_1 - P_2/C_R$, where $P_{diff}$ is the differential pressure, $P_1$ is the hydraulic pressure on the piston side, $P_2$ is the hydraulic pressure on the piston rod side and $C_R$ is the cylinder ratio. The cylinder ratio $C_R$ is in its turn defined as the effective pressure area on the piston side of the hydraulic cylinder divided by the effective pressure area on the piston rod side of the hydraulic cylinder.

For a stabilizer leg provided with a hydraulic cylinder for extending the stabilizer leg vertically downwards into contact with the ground, the support force acting on the stabilizer leg when it is in supporting contact with the ground affects the differential pressure in the hydraulic cylinder. The differential pressure in the hydraulic cylinder of such a stabilizer leg may be determined by means of an electronic control device based on a first measuring value representing the hydraulic pressure on the piston side of the hydraulic cylinder and a second measuring value representing the hydraulic pressure on the piston rod side of the hydraulic cylinder. The electronic control device may be configured to compare the established value of the differential pressure in the hydraulic cylinder with a given threshold value and establish that the stabilizer leg is in the active supporting position if the differential pressure is higher than the threshold value. However, a high differential pressure resembling the differential pressure that is developed in the hydraulic cylinder when the stabilizer is pressed against the ground in the active supporting position may also be developed in the hydraulic cylinder in a situation when it has reached its advanced end position before the stabilizer leg has been pressed against the ground. Thus, in order to avoid an erroneous establishment that a stabilizer leg is in the active supporting position, a system that is configured to use the value of the differential pressure in the hydraulic cylinder of the stabilizer leg in order to establish whether or not the stabilizer leg is in the active supporting position also has to include an additional sensor for detecting whether or not the hydraulic cylinder of the stabilizer leg is in its advanced end position. Thus, a large number of sensors is required with this previously known solution.

It is also previously known to establish whether or not a stabilizer leg is in the active supporting position based on measuring values from a load sensor located in or close to a foot plate of the stabilizer leg. A disadvantage with this type of solution is that the load sensor is located close to the ground when the stabilizer leg is in use, which implies an increased risk for damages to the load sensor.

OBJECT OF THE INVENTION

The object of the present invention is to provide a new and favourable manner of detecting whether or not a stabilizer leg is in supporting contact with the ground.

SUMMARY OF THE INVENTION

According to the present invention, said object is achieved by means of a stabilizer leg arrangement having the features defined herein.

The stabilizer leg arrangement according to the present invention comprises a support structure and a stabilizer leg carried by the support structure, the stabilizer leg being provided with a hydraulic cylinder, by means of which the stabilizer leg is extensible in a vertical direction in relation to the support structure from a raised inactive position, in which the stabilizer leg is out of contact with the ground, to an active supporting position, in which the stabilizer leg is in supporting contact with the ground,
wherein the hydraulic cylinder comprises:
  a cylinder housing having an internal space,
  a piston movably received in said internal space and configured to divide this space into a first chamber on a first side of the piston and a second chamber on an opposite second side of the piston, and
  a piston rod fixed to the piston and extending through the second chamber, the piston being moveable in relation to the cylinder housing to an advanced end position, in which the piston abuts against a stop surface at a lower end of the internal space and in which the second chamber has its minimum volume.

The stabilizer leg arrangement further comprises a pressure sensor configured to generate a measuring value representing the hydraulic pressure in said first chamber, and an electronic control device connected to the pressure sensor, wherein the electronic control device is configured to establish information as to whether or not the stabilizer leg is in the active supporting position while taking into account said measuring value.

According to the invention, the second chamber is configured to come into fluid communication with the first chamber through at least one flow channel in the hydraulic cylinder when the piston reaches the advanced end position or is on the verge of reaching this end position, wherein the piston is configured to keep the second chamber fluidly separated from the first chamber when the piston is in any other position in relation to the cylinder housing. Thus, when the piston reaches or is on the verge of reaching the advanced end position, the first and second chambers on the opposite sides of the piston will be fluidly connected to each other and the hydraulic pressures in the first and second chambers will thereby be equalized. The effect of this pressure equalization makes it possible to avoid an erroneous detection that the stabilizer leg is in supporting contact with the ground, as explained in closer detail in the description following below, without requiring any sensor in addition to one or two pressure sensors.

Further advantageous features of the stabilizer leg arrangement according to the present invention will appear from the description following below and the dependent claims.

The invention also relates to a mobile working machine having the features defined herein.

Further advantageous features of the mobile working machine according to the present invention will appear from the description following below.

The invention also relates to a method having the features defined herein.

Further advantageous features of the method according to the present invention will appear from the description following below.

BRIEF DESCRIPTION OF THE DRAWINGS

The invention will in the following be more closely described by means of embodiment examples, with reference to the appended drawings. In the drawings.

DETAILED DESCRIPTION OF EMBODIMENTS OF THE INVENTION

Figure 1:
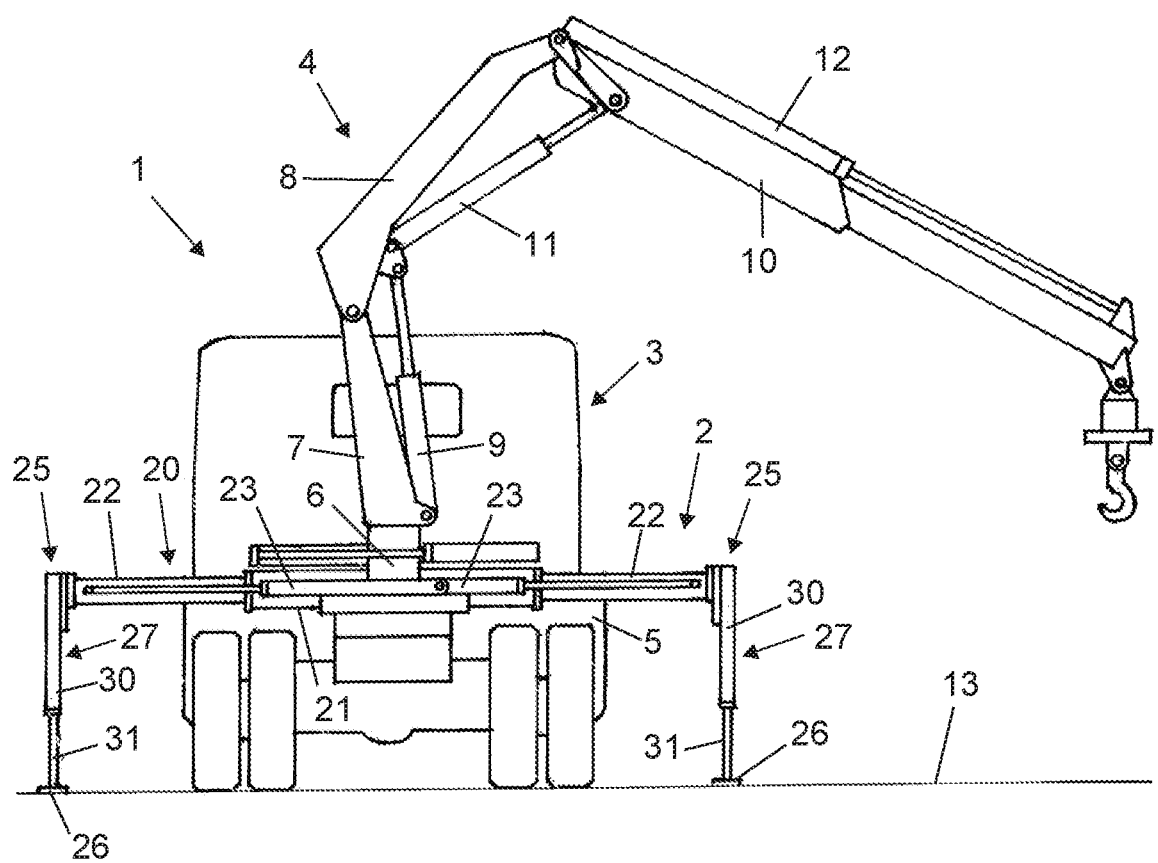
FIG. 1 is a schematic rear view of a mobile working machine provided with a hydraulic crane and a stabilizer leg arrangement according to the present invention.
Figure 2:
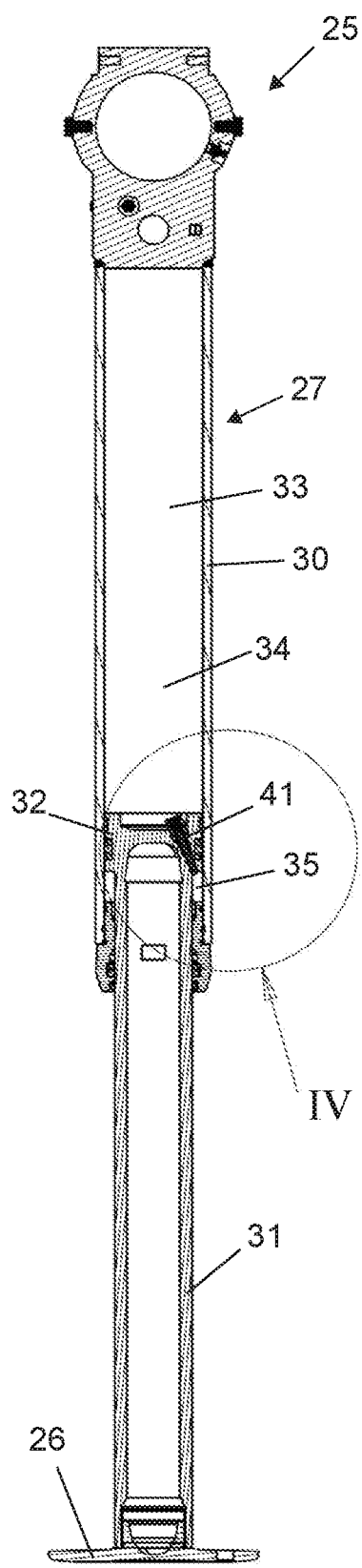
FIGS. 2 and 3 are longitudinal sections through a hydraulic cylinder according to a first variant, as seen with the piston in different positions.
Figure 3:
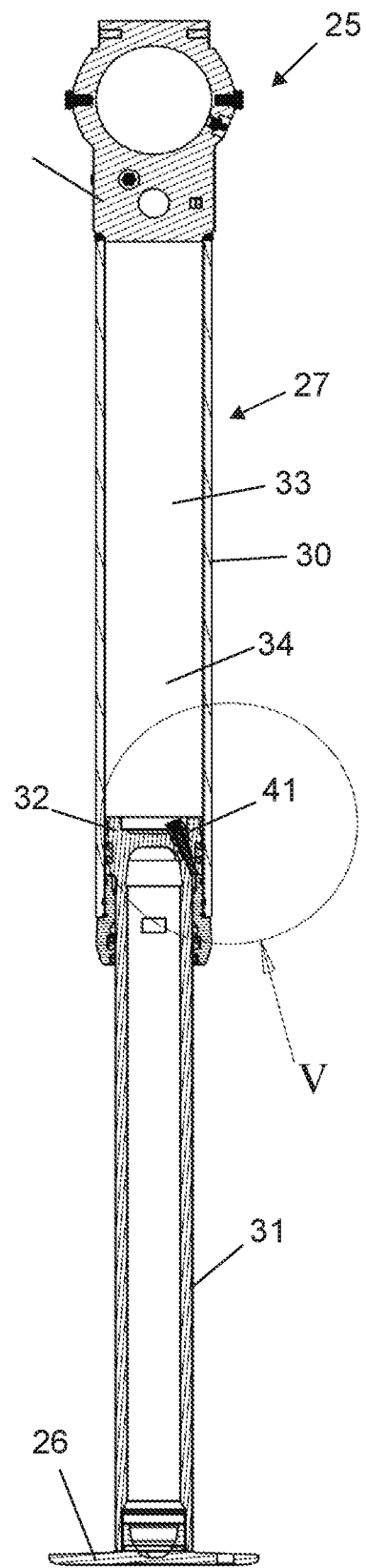
Figure 4:
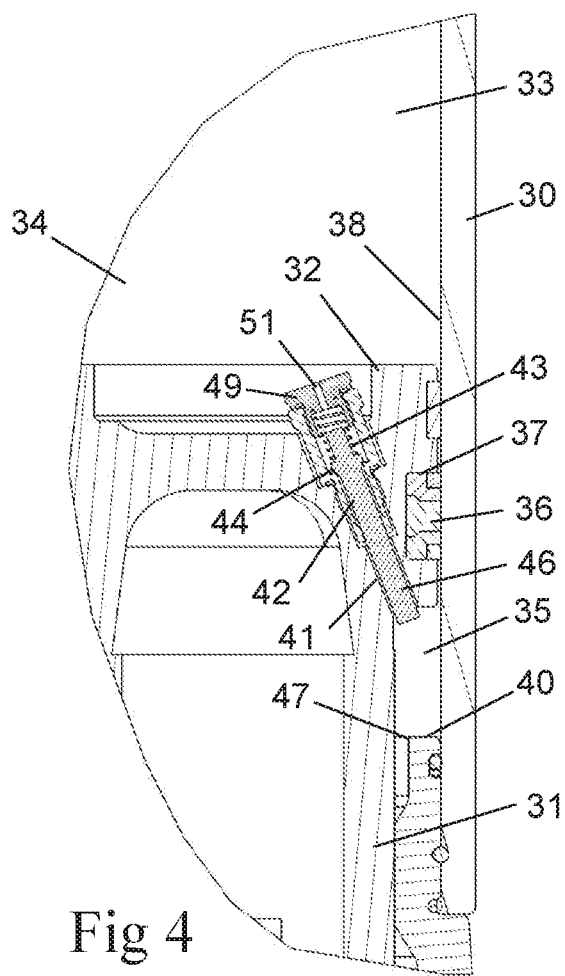
FIG. 4 is a detail enlargement according to the circle IV in FIG. 2.
Figure 5:
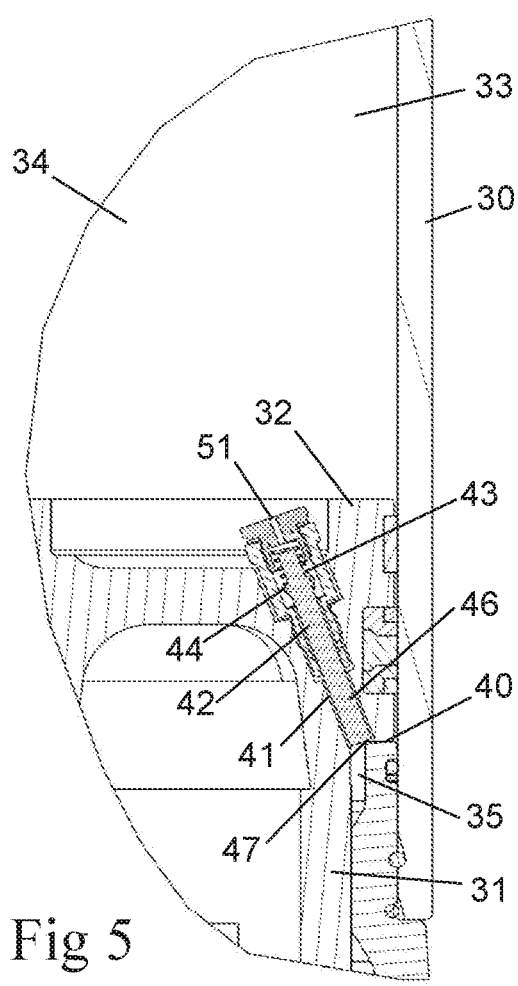
FIG. 5 is a detail enlargement according to the circle V in FIG. 3.

FIG. 1 schematically illustrates a mobile working machine 1 provided with a stabilizer leg arrangement 2 according to an embodiment of the present invention for supporting the mobile working machine against the ground. In the illustrated example, the mobile working machine 1 is a crane vehicle comprising a vehicle 3 and a hydraulic crane 4. The crane 4 is mounted to a chassis 5 of the vehicle 3, either by being fixed directly to the chassis 5 or by being fixed to a subframe, which in its turn is fixed to the chassis 5.

The illustrated crane 4 comprises:

a crane base 6, which is fixed to the chassis 5 of the vehicle 3;

a crane column 7 which is rotatably mounted to the crane base 6 so as to be rotatable in relation to the crane base about an essentially vertical axis of rotation;

a liftable and lowerable first crane boom 8, which is articulately connected to the crane column 7 in such a manner that it is pivotable in relation to the crane column about an essentially horizontal axis of rotation;

a first hydraulic cylinder 9 for lifting and lowering the first crane boom 8 in relation to the crane column 7;

a liftable and lowerable second crane boom 10, which is articulately connected to the first crane boom 8 in such a manner that it is pivotable in relation to the first crane boom 8 about an essentially horizontal axis of rotation; and a second hydraulic cylinder 11 for lifting and lowering the second crane boom 10 in relation to the first crane boom 8.

The above-mentioned second crane boom 10 is telescopically extensible by means of a hydraulic cylinder 12 in order to enable an adjustment of the extension length thereof.

The stabilizer leg arrangement 2 comprises a support structure 20. In embodiment illustrated in FIG. 1, the support structure 20 comprises a support beam 21 and two extension arms 22 mounted to the support beam 20 on opposite sides thereof. The support beam 21 is fixedly connected to the chassis 5 of the vehicle 3. In the embodiment illustrated in FIG. 1, the support beam 21 may be rigidly mounted to the crane base 6, wherein the support beam 21 is fixedly connected to the chassis 5 via the crane base 6. However, the support beam 21 may as an alternative be mounted directly to the chassis 5, i.e. not directly connected to e.g. a crane.

Each extension arm 22 is telescopically extensible in order to allow an adjustment of the horizontal extension length thereof. Each extension arm 22 is telescopically mounted to the support beam 21 so as to be axially slidable in relation to the support beam 21 in the longitudinal direction of the extension arm 22 in order to vary the horizontal extension length thereof. Each extension arm 22 is horizontally moveable in relation to the support beam 21 by means of a hydraulic cylinder 23 or any other suitable type of linear actuator.

A stabilizer leg 25 is mounted to each extension arm 22 at an outer end thereof, wherein the stabilizer leg 25 is extensible in a vertical direction in relation to the extension arm 22. Each stabilizer leg 25 comprises a foot plate 26, which is arranged at a lower end of the stabilizer leg. Furthermore, each stabilizer leg 25 comprises a hydraulic cylinder 27, by means of which the stabilizer leg is manoeuvrable in relation to the extension arm 22 between a raised inactive position, in which the stabilizer leg is raised from the ground 13, and an active supporting position, in which the stabilizer leg is in supporting contact with the ground 13. In the active supporting position, the foot plate 26 of the stabilizer leg 25 is pressed against the ground 13.

In the illustrated embodiment, the hydraulic cylinder 27 of each stabilizer leg 25 comprises a cylinder housing 30, which forms an upper part of the stabilizer leg, and a piston rod 31, which forms a lower part of the stabilizer leg. The foot plate 26 is fixed to the lower end of the piston rod 31.

Four different variants of a hydraulic cylinder 27 suitable for use in a stabilizer leg 25 of a stabilizer leg arrangement according to the present invention are illustrated in FIGS. 2-12. The piston rod 31 of the hydraulic cylinder 27 is at its upper end fixed to a piston 32, which is movably received in an internal space 33 of the cylinder housing 30. The piston 32 divides the internal space 33 of the cylinder housing into a first chamber 34 on a first side of the piston and a second chamber 35 on an opposite second side of the piston. An annular sealing member 36 is arranged in an annular recess 37 in the envelop surface of the piston 32, wherein this sealing member 36 is in sliding and fluid-tight contact with a cylindrical inner wall 38 of the cylinder housing 30 in order to form a sealed interface between the piston 32 and the inner wall 38 of the cylinder housing. The piston rod 31 extends through the second chamber 35, which implies that the above-mentioned second side of the piston 32 constitutes the piston rod side of the hydraulic cylinder 27 and that the above-mentioned first side of the piston 32 constitutes the piston side thereof.

The piston 32 is moveable in relation to the cylinder housing 30 to an advanced end position (see FIGS. 5, 6, 8 and 12), in which the piston 32 abuts against a stop surface 40 at a lower end of the internal space 33 and in which the second chamber 35 has its minimum volume. The second chamber 35 is configured to come into fluid communication with the first chamber 34 through at least one flow channel 41, 41', 41" in the hydraulic cylinder 27 when the piston 32 reaches the advanced end position or is on the verge of reaching this end position, wherein the piston 32 is configured to keep the second chamber 35 fluidly separated from the first chamber 34 when the piston 32 is in any other position in relation to the cylinder housing 30, i.e. when the piston 32 is not in or on the verge of reaching the advanced end position.

In a first variant of the hydraulic cylinder 27 illustrated in FIGS. 2-6a, the above-mentioned flow channel 41 extends through the piston 32. In this case, the piston 32 is provided with a valve member 42, which is moveable between a closed position (see FIG. 4, in which the valve member 42 obstructs fluid flow through the flow channel 41, and an open position (see FIGS. 5 and 6a), in which the valve member 42 allows hydraulic fluid to flow through the flow channel 41 from the first chamber 34 to the second chamber 35. Thus, when the valve member 42 is in the closed position, hydraulic fluid is prevented from flowing from the first chamber 34 to the second chamber 35.

The valve member 42 is configured to be automatically moved to the open position when the piston 32 reaches or is on the verge of reaching the advanced end position. In the illustrated example, the valve member 42 is moveable from the closed position to the open position against the action of a spring member 43 and from the open position to the closed position by the action of the spring member 43. The illustrated valve member 42 comprises:

a head part 44, which is configured to be in fluid-tight contact with a valve seat 45 when the valve member 42 is in the closed position to thereby obstruct the flow channel 41 and prevent fluid flow through it; and an elongated stem part 46, which is fixed to the head part 44 and extends through the flow channel 41, wherein the stem part 46 is configured to come into contact with a stop 47 at the lower end of the internal space 33 of the cylinder housing 30 when the piston 32 is on the verge of reaching the advanced end position to thereby push the head part 44 away from the valve seat 45 and open up the flow channel 41.

In the illustrated example, the stop 47 is formed by an edge on the above-mentioned stop surface 40. However, the stop 47 and the stop surface 40 may as an alternative be separated from each other.

In the illustrated example, the above-mentioned spring member 43 has the form of a helical compression spring, which at a first end abuts against a shoulder 48 on the head part 44 and at an opposite second end abuts against an end cap 49 that is fixed to a sleeve-shaped part 50 at an upper end of the flow channel 41. Hydraulic fluid is allowed to flow into the flow channel 41 through a passage 51 in the end cap 49.

The valve member 42 may of course also have any other suitable design in addition to the design illustrated in FIGS. 4-6a.

Figure 6A:
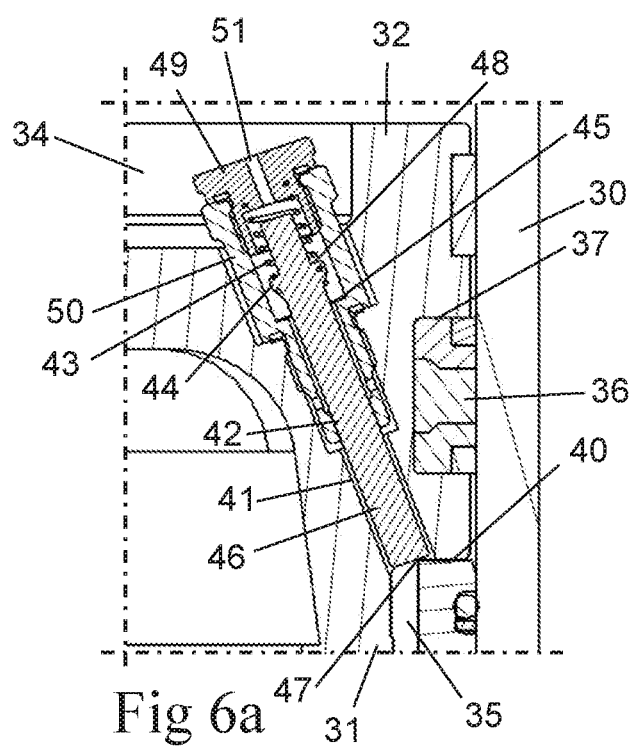
FIG. 6a is a longitudinal section through a part of the hydraulic cylinder of FIGS. 2 and 3.
Figure 6B:
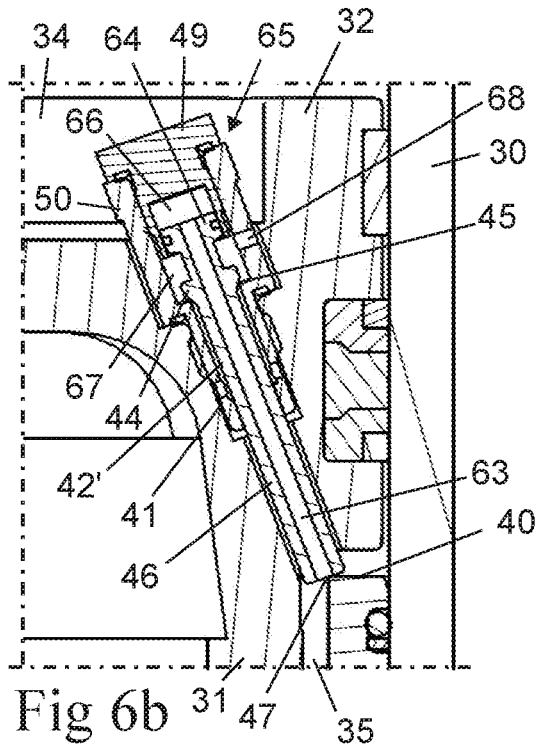
FIG. 6b is a longitudinal section through a part of a hydraulic cylinder according to a second variant

In the variant illustrated in FIG. 6b, the hydraulic cylinder is provided with a valve member 42' resembling the valve member illustrated in FIG. 6a. This valve member 42' is moveable to the open position in the same manner as the valve member 42 illustrated in FIG. 6a. However, this valve member 42' is not configured to co-operate with any spring member. The valve member 42' illustrated in FIG. 6b is provided with an axial channel 63, which is open at both ends and extends inside the valve member from the lower end of the valve member to the upper end thereof. A piston 64 is provided at the upper end of the valve member 42', wherein this piston 64 is slidably received in an inner space of a valve housing 65 formed by a sleeve-shaped part 50 and an associated end cap 49. The piston 64 divides this inner space into an upper chamber 66 and a lower chamber 67, wherein the upper chamber 66 is in fluid communication with the second chamber 35 through the channel 63 and the lower chamber 67 is in fluid communication with the first chamber 34 through a radially extending through hole 68 in the sleeve-shaped part 50 of the valve housing 65. When the piston 32 of the hydraulic cylinder is to be moved upwards in relation to the cylinder housing 30 under the effect of hydraulic fluid fed into the second chamber 35, hydraulic fluid will flow into the upper chamber 66 of the valve housing through the channel 63 in the valve member 42' and the piston 64 of the valve member is thereby pushed downwards in relation to the valve housing 65, whereby the valve member 42' is made to assume its closed position with the head part 44 in fluid-tight contact with the associated valve seat 45.

Figures 7, 8:
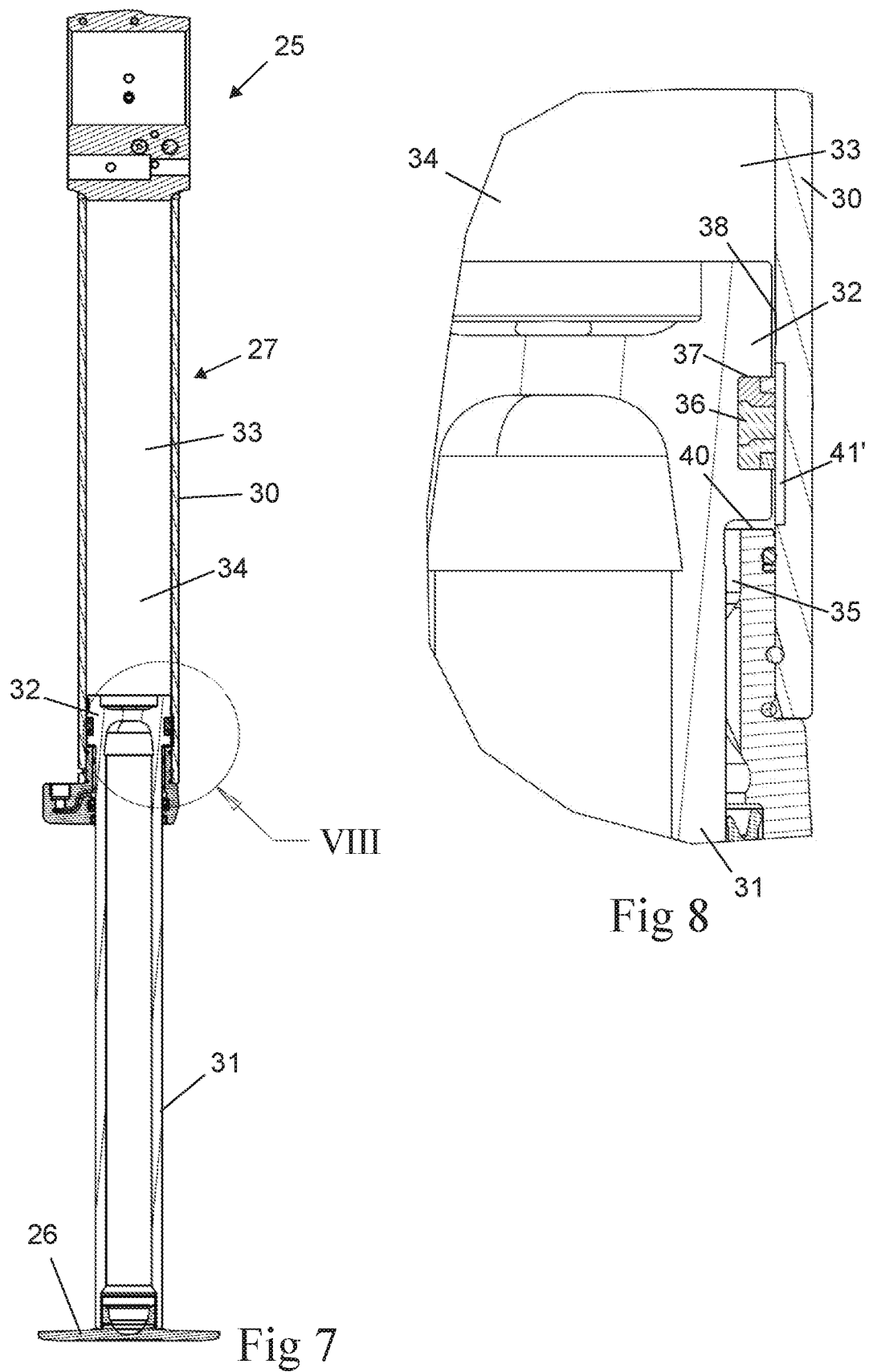
FIG. 7 is a longitudinal section through a hydraulic cylinder according to a third variant, as seen with the piston in an advanced end position.
FIG. 8 is a detail enlargement according to the circle VIII in FIG. 7, FIGS. 9 and 10 are longitudinal sections through a hydraulic cylinder according to a fourth variant, as seen with the piston in different positions.
Figure 9:
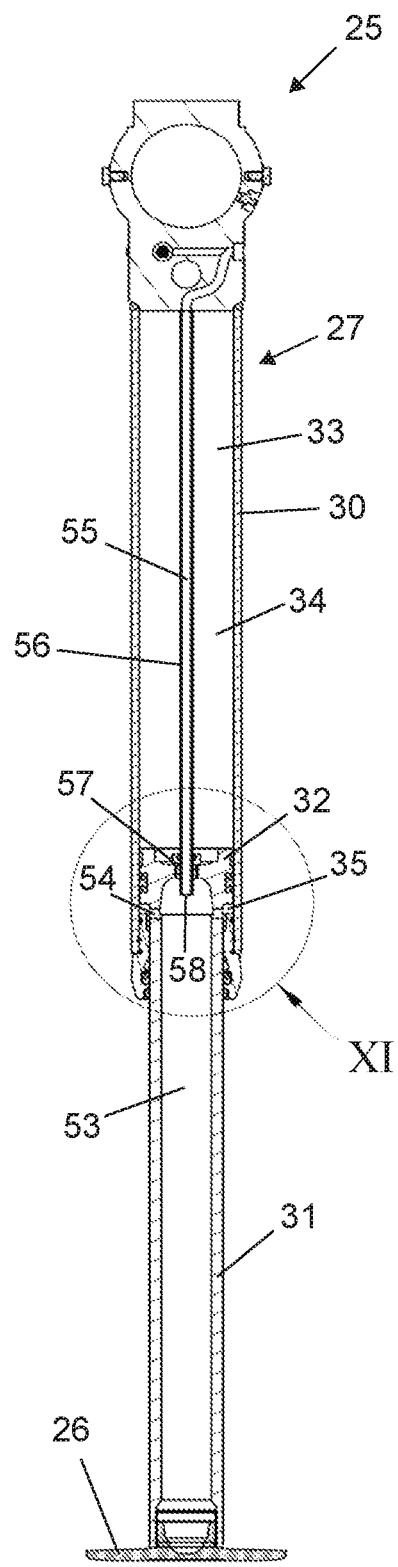
Figure 10:
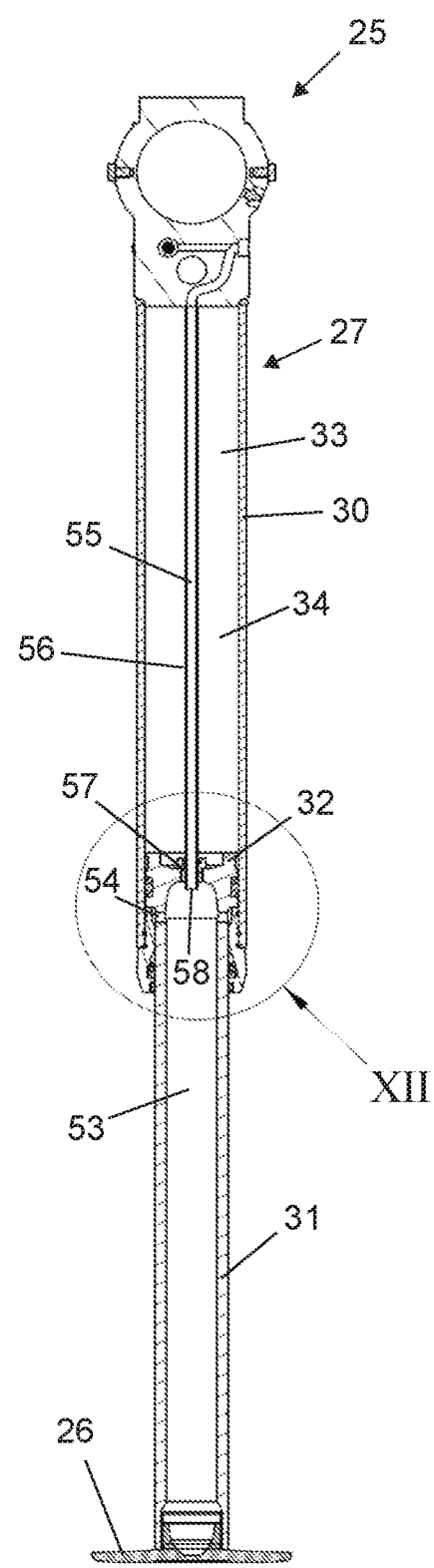
Figure 11:
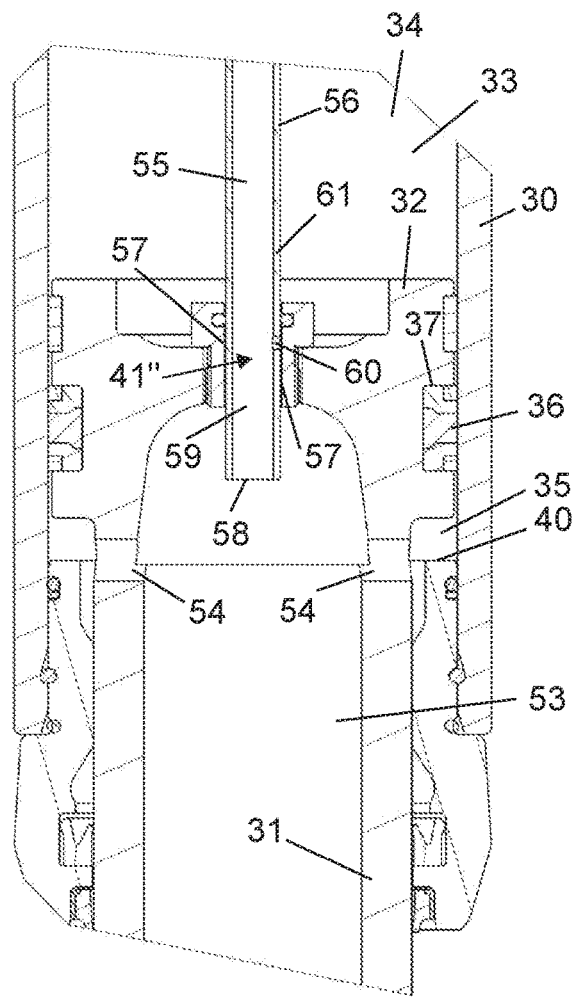
FIG. 11 is a detail enlargement according to the circle XI in FIG. 9.

In a third variant of the hydraulic cylinder 27 illustrated in FIGS. 7 and 8, the above-mentioned flow channel 41' is formed as an axial groove in the cylindrical inner wall 38 of the cylinder housing 30. This axial groove 41' has a larger extension in the axial direction of the cylinder housing 30 than the sealing member 36 to thereby allow sealing member 36 to assume a position between the upper and lower ends of the groove 41' when the piston 32 is in the advanced end position, as illustrated in FIG. 8. Thus, when the piston 32 is in the advanced end position, the upper end of the groove 41' is in fluid communication with the first chamber 34 and the lower end of the groove 41' in fluid communication with the second chamber 35. When the piston 32 is at a distance from the advanced end position with the sealing member 36 overlapping or being positioned above the upper end of the groove 41', there is no fluid communication between the first chamber 34 and the groove 41' and consequently no fluid communication between the first and second chambers 34, 35 via this groove 41'.

Figure 12:
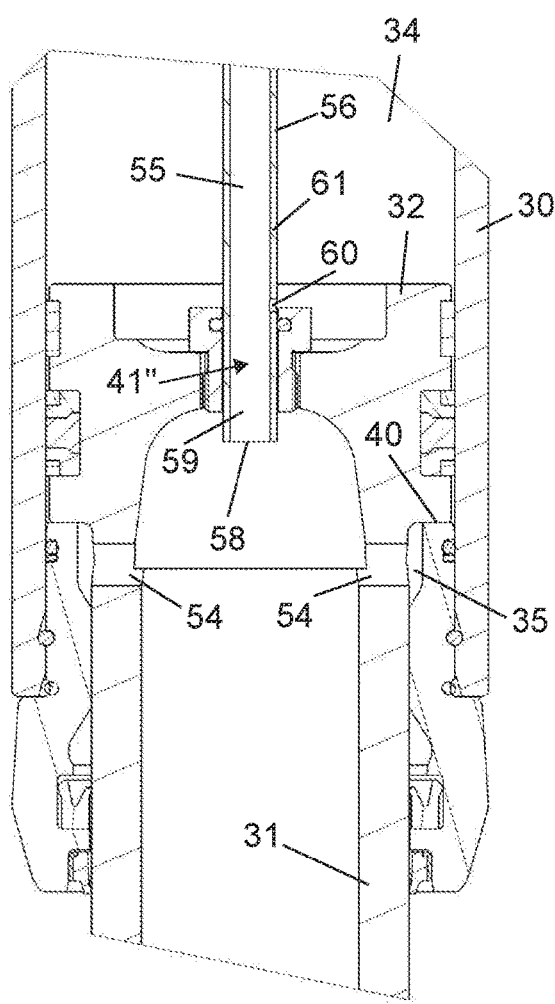
FIG. 12 is a detail enlargement according to the circle XII in FIG. 10, and FIGS. 13-15 are outline diagrams of parts included in a stabilizer leg arrangement according to different embodiments of the invention.

In a fourth variant of the hydraulic cylinder 27 illustrated in FIGS. 9-12, hydraulic fluid is supplied to and discharged from the second chamber 35 through a feed and discharge channel 55 in an elongated and rigid pipe 56, which is fixed to the cylinder housing 30 at an upper end thereof and which extends axially through the first chamber 34. In this variant, an internal space 53 of the piston rod 31 is in fluid communication with the second chamber 35 through radially extending through holes 54 at the upper end of the piston rod. The pipe 56 extends through an axial through hole 57 in the piston 32 and an inlet and outlet opening 58 is provided at the lower end of the pipe 56. The pipe 56 has such a length that the inlet and outlet opening 58 is located in the internal space 53 of the piston rod 31 in all possible positions of the piston 32, i.e. also when the piston is in the advanced end position illustrated in FIG. 12. Thus, the feed and discharge channel 55 is always in fluid communication with the second chamber 35 via the inlet and outlet opening 58 and the through holes 54 in order to allow hydraulic fluid to be fed into the second chamber 35 via the pipe 56 when the piston rod 31 and the foot plate 26 at the lower end of the piston rod are to be moved upwards in relation to the cylinder housing 30 and allow hydraulic fluid to be discharged from the second chamber 35 via the pipe 56 when the piston rod 31 and the foot plate 26 are to be moved upwards in relation to the cylinder housing. In this variant of the hydraulic cylinder 27, the above-mentioned flow channel 41" is formed by a section 59 of the feed and discharge channel 55 at the lower end thereof and by at least one through hole 60 in the wall 61 of the pipe 56 at the upper end of this channel section 59. The through hole 60 has such a position in the axial direction of the pipe 56 that it is received in the first chamber 34 when the piston 32 is in the advanced end position, as illustrated in FIG. 12. Thus, when the piston 32 is in the advanced end position, the feed and discharge channel 55 is in fluid communication with the first chamber 34 via the through hole 60 in the pipe 56 and in fluid communication with the second chamber 35 via the inlet and outlet opening 58 in the pipe 56 and the through holes 54 in the piston rod 31, which implies that the first and second chambers 34, 35 are in fluid communication with each other via the above-mentioned section 59 of the feed and discharge channel 55. When the piston 32 is at a distance from the advanced end position and overlaps or is positioned above the through hole 60, there is no fluid communication between the first chamber 34 and the feed and discharge channel 55 and consequently no fluid communication between the first and second chambers 34, 35 via this channel.

The stabilizer leg arrangement 2 comprises a pressure sensor 70 (very schematically illustrated in FIGS. 13-15) configured to generate a measuring value V1 representing the hydraulic pressure in the first chamber 34 of the hydraulic cylinder 27. In the following, this pressure sensor 70 is denominated first pressure sensor and the measuring value V1 is denominated first measuring value. The stabilizer leg arrangement 2 also comprises an electronic control device 72. The electronic control device 72 is connected to the first pressure sensor 70 in order to receive information about said first measuring value V1 from this sensor, wherein the electronic control device 72 is configured to establish information as to whether or not the stabilizer leg 25 is in the active supporting position while taking into account this measuring value V1. The possibility for the electronic control device 72 to establish this information based on the first measuring value V1 from the first pressure sensor 70, without any additional measuring value from e.g. a length sensor, is due to the fact that the hydraulic pressures in the first and second chambers 34, 35 of the hydraulic cylinder 27 are equalized by the fluid communication through the above-mentioned flow channel 41, 41', 41" when the piston 32 reaches the advanced end position or is on the verge of reaching this end position.

The electronic control device 72 may be implemented by one single electronic control unit or by two or more mutually co-operating electronic control units.

Figure 13:
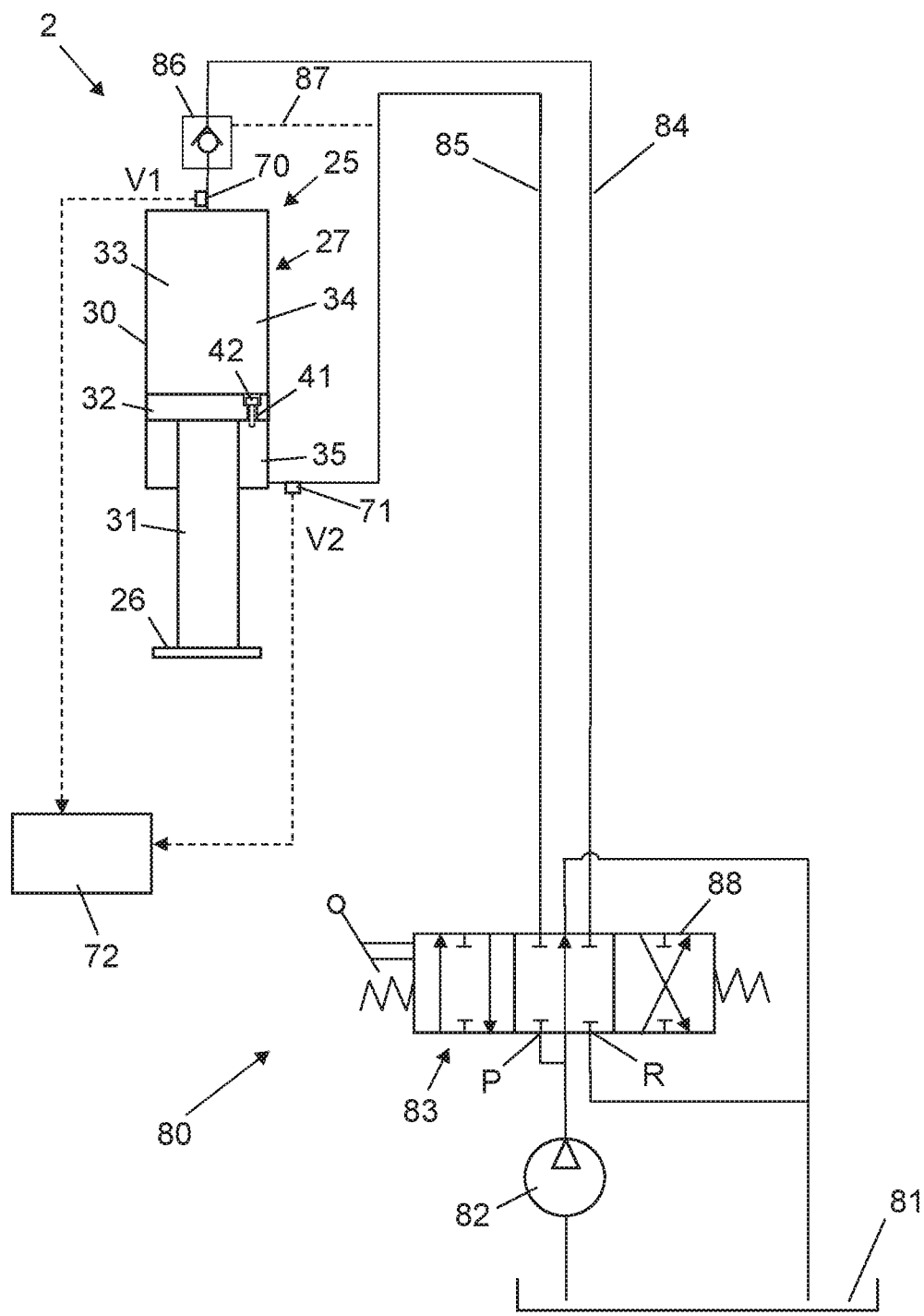
Figure 14:
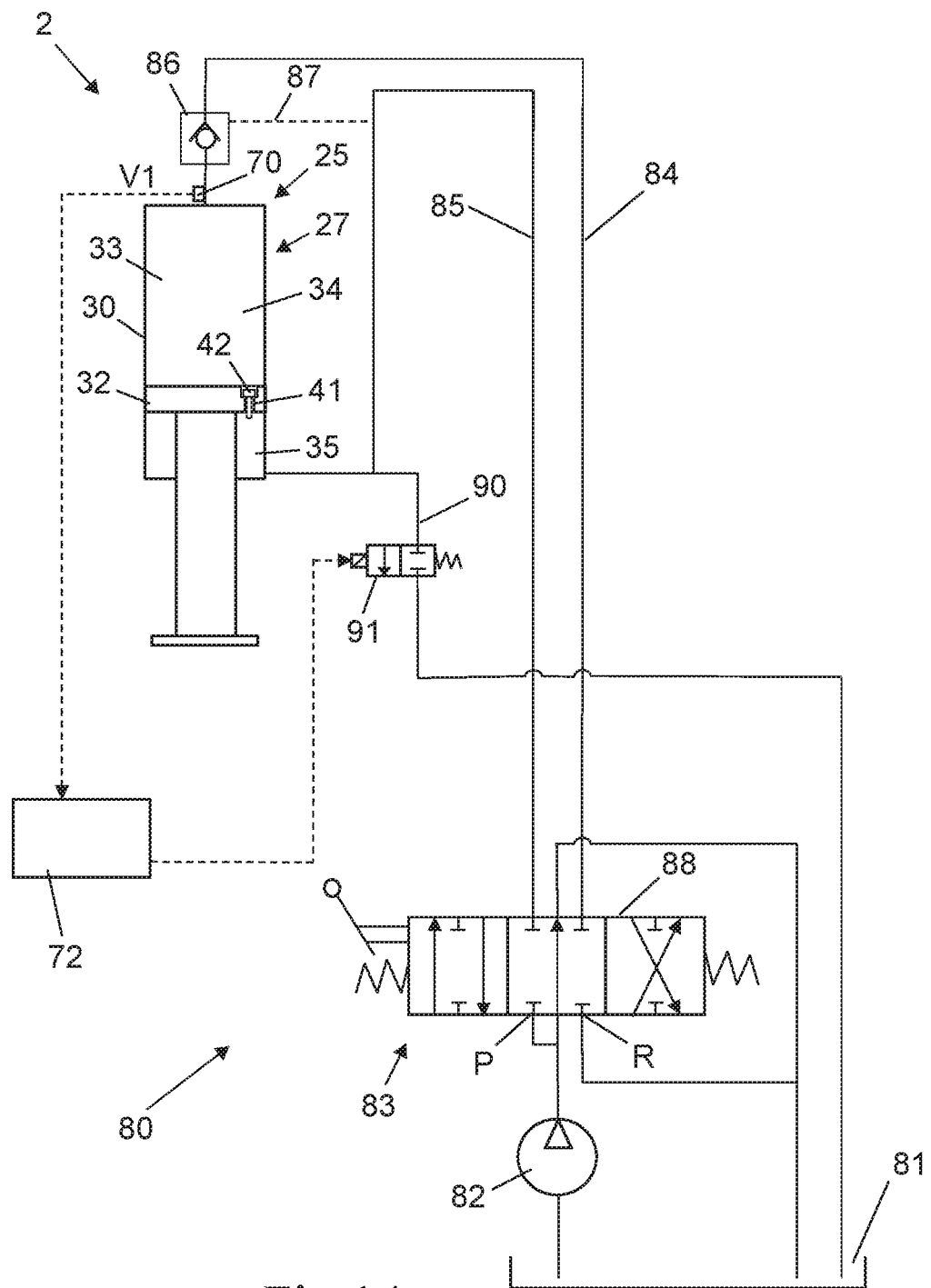
Figure 15:
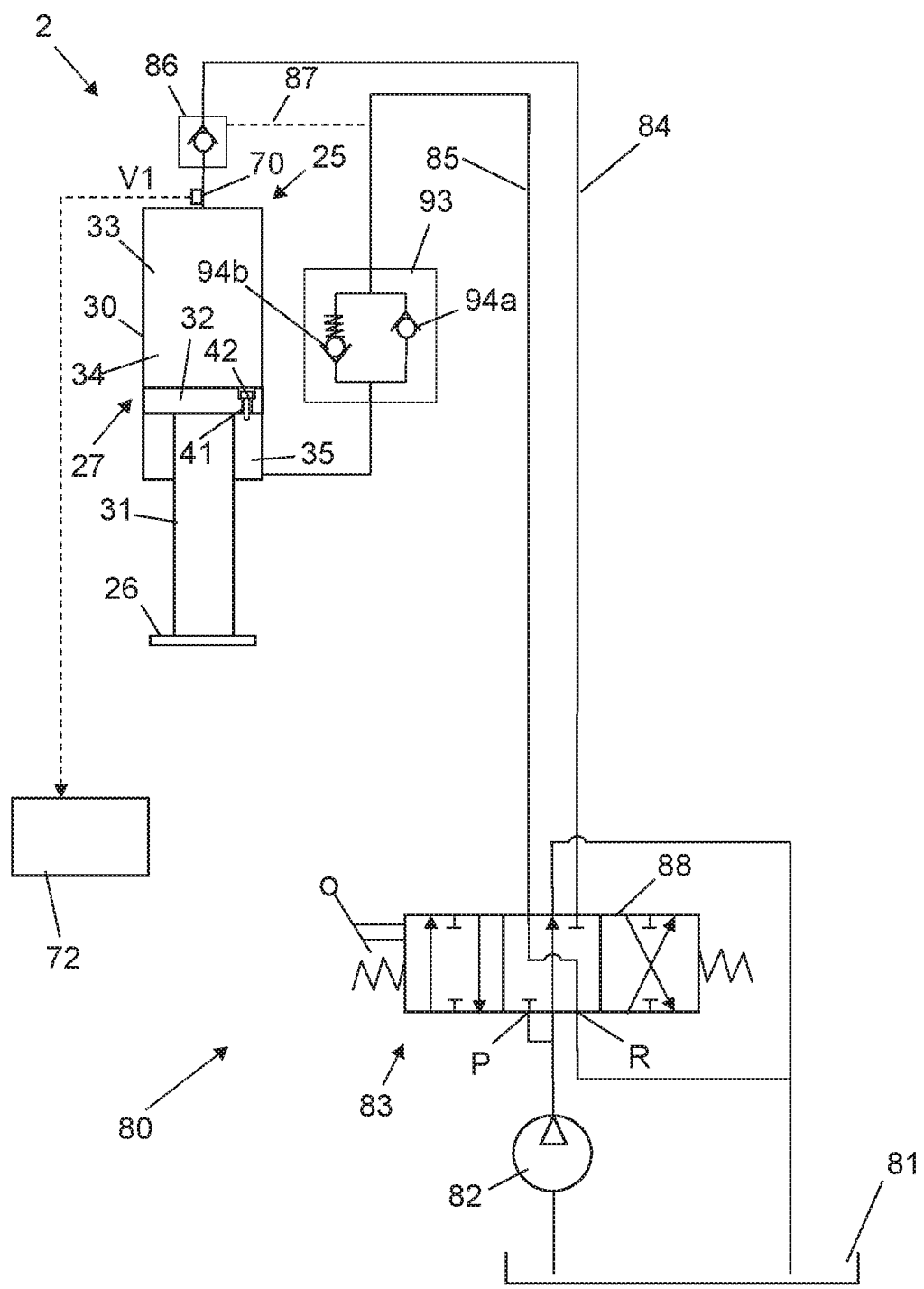

The manner in which the electronic control device 72 is configured to use the first measuring value V1 in order to establish the above-mentioned information depends on the layout of the hydraulic system 80 to which the hydraulic cylinder 27 is connected. Three alternative variants of this hydraulic system 80 are illustrated in FIGS. 13-15. In all variants, the hydraulic system 80 comprises a hydraulic fluid reservoir 81, a pump 82 and a directional control valve 83, wherein the directional control valve is provided with a pressure port P and a return port R. The pump 82 is configured to pump hydraulic fluid from the reservoir 81 to the pressure port P. The return port R is connected to the reservoir 81 in order to allow hydraulic fluid to be returned from the directional control valve 83 to the reservoir via the return port. The first chamber 34 of the hydraulic cylinder 27 is connected to the directional control valve 83 through a first hydraulic line 84 and the second chamber 35 is connected to the directional control valve 83 through a second hydraulic line 85. A pilot-operated check valve 86 is provided in the first hydraulic line 84, wherein this pilot-operated check valve 86 has pilot line 87 connected to the second hydraulic line 85. The pilot-operated check valve 86 is configured to open and allow discharge of hydraulic fluid from the first chamber 34 when the hydraulic pressure in the second hydraulic line 85, and thereby in the pilot line 87, exceeds a predetermined level.

The directional control valve 83 is provided with a valve spool 88, which is moveable between:
  a first working position, in which the pressure port P is connected to the first chamber 34 and the return port R is connected to the second chamber 35,
  a second working position, in which the pressure port P is connected to the second chamber 35 and the return port R is connected to the first chamber 34, and
  a normal position, in which the pressure port P is disconnected from the first and second chambers 34, 35.

In FIGS. 13-15, the valve spool 88 is shown in the normal position. In the examples illustrated in FIGS. 13-15, the valve spool 88 will be moved from the normal position to the first working position by being moved to the left under the effect of an actuating force acting on the valve spool 88 in a first direction, and from the normal position to the second working position by being moved to the right under the effect of an actuating force acting on the valve spool 88 in an opposite second direction. The valve spool 88 is configured to automatically return to the normal position on removal of the actuating force. An operator may control the directional control valve 83 and thereby the extension and retraction of the stabilizer leg 27 in a conventional manner by actuating a manoeuvring member of a manoeuvring unit.

In the embodiment illustrated in FIG. 13, a second pressure sensor 71 is configured to generate a second measuring value V2 representing the hydraulic pressure in the second chamber 35 of the hydraulic cylinder 27. In this embodiment, the electronic control device 72 is configured to establish the magnitude of the differential pressure $P_{diff}$ in the hydraulic cylinder 27 based on the first and second measuring values V1, V2 from the first and second pressure sensors 70, 71. Due to the presence of the piston rod 31 on the piston rod side of the hydraulic cylinder, the effective pressure area on the piston rod side is smaller than the effective pressure area on the piston side. Thus, there will be a differential pressure in the hydraulic cylinder 27 also in a situation when the hydraulic pressure in the second chamber 35 is equal to the hydraulic pressure in the first chamber 34. In this embodiment, the electronic control device 72 is configured to compare the established value of the differential pressure $P_{diff}$ in the hydraulic cylinder 27 with a given threshold value $V_{th}$, wherein a differential pressure $P_{diff}$ lower than the threshold value $V_{th}$ always implies that the stabilizer leg 25 is not in the active supporting position.

In the embodiment illustrated in FIG. 13, the first and second chambers 35 are disconnected from the reservoir 81 when the valve spool 88 of the directional control valve 83 is in the normal position. In this case, the hydraulic pressure in the second chamber 35 may remain at a rather high level if the valve spool 88 is rapidly returned to the normal position after the moment when the piston 32 has reached the advanced end position and the hydraulic pressures in the first and second chambers have been equalized via the flow channel 41. This implies that there is a possibility that the differential pressure $P_{diff}$ in the hydraulic cylinder 27 could exceed the threshold value $V_{th}$ when the piston 32 is in the advanced end position with equal hydraulic pressures in the first and second chambers 34, 35. However, a situation with a differential pressure $P_{diff}$ higher than the threshold value $V_{th}$ and unequal hydraulic pressures in the first and second chambers 34, 35 will only ensue when the stabilizer leg 25 is in the active supporting position with the foot plate 26 pressed against the ground and not when the piston 32 has reached the advanced end position before the stabilizer leg 25 has been pressed against the ground. Thus, in this embodiment, the electronic control device 72 is configured to establish that the stabilizer leg 25 is in the active supporting position if it is established by the electronic control device that the following conditions are simultaneously fulfilled:

the differential pressure $P_{diff}$ in the hydraulic cylinder 27 is higher than the threshold value $V_{th}$, and the above-mentioned first measuring value V1 differs from the above-mentioned second measuring value V2.

In the embodiment illustrated in FIG. 14, the hydraulic system 80 comprises a bypass line 90 configured to form a connection between the second chamber 35 and the reservoir 81. Via the bypass line 90, hydraulic fluid may flow from the second chamber 35 to the reservoir 81 without passing through the directional control valve 83. A control valve 91 is arranged in the bypass line 90, wherein the control valve 91 is shiftable between a closed position, in which the control valve 91 is configured to prevent fluid flow through the bypass line 90, and an open position, in which the second chamber 35 is in fluid communication with the reservoir 81 through the bypass line 90. In this embodiment, the return port R of the directional control valve 83 is disconnected from the first and second chambers 34, 35 in the normal position of the valve spool 88. In a situation when the control valve 91 is in the open position with the second chamber 35 in fluid communication with the reservoir 81 through the bypass line 90, the hydraulic pressure in the first chamber 34, i.e. the above-mentioned first measuring value V1, can only assume a high value when the stabilizer leg 25 is in the active supporting position with the foot plate 26 pressed against the ground and not when the piston 32 has reached the advanced end position before the stabilizer leg 25 has been pressed against the ground. Thus, in this embodiment, the electronic control device 72 is configured to control the control valve 91 to assume the open position at the moment when the electronic control device 72 is to establish the information as to whether or not the stabilizer leg 25 is in the active supporting position, wherein the electronic control device 72 is configured to establish that the stabilizer leg 25 is in the active supporting position if it is established by the electronic control device that the first measuring value V1 is higher than a given threshold value when the control valve 91 is in the open position. Thus, in this case a measuring value V1 from one single pressure sensor 70 is sufficient in order to establish whether or not the stabilizer leg 25 is in the active supporting position. However, with the layout of the hydraulic system 80 illustrated in FIG. 14, it would also be possible to use an additional second measuring value V2 from a second pressure sensor that is configured to sense the hydraulic pressure of the second chamber 35, or make the assumption that the hydraulic pressure in the second chamber 35 has a fixed low value corresponding to the reservoir pressure, wherein the electronic control device 72 is configured to establish that the stabilizer leg 25 is in the active supporting position if it is established by the electronic control device that the differential pressure $P_{diff}$ in the hydraulic cylinder 27 is higher than a given threshold value $V_{th}$.

In the embodiment illustrated in FIG. 15, the return port R of the directional control valve 83 is connected to the second chamber 35 in the normal position of the valve spool 88. Furthermore, a valve device 93 with two oppositely directed check valves 94a, 94b is arranged in the second hydraulic line 85. A first check valve 94a of the valve device 93 is arranged to obstruct flow of hydraulic fluid from the second chamber 35 towards the directional control valve 83 and a second check valve 94b is arranged to obstruct flow of hydraulic fluid from the directional control valve 83 towards the second chamber 35, wherein the first check valve 94a has a cracking pressure to make sure that the first check valve 94a is closed when the second check valve 94b is open. The valve cracking pressure of the second check valve 94b is to be so low that the hydraulic pressure in the first chamber 34, i.e. the above-mentioned first measuring value V1, can only assume a high value when the stabilizer leg 25 is in the active supporting position with the foot plate 26 pressed against the ground and not when the piston 32 has reached the advanced end position before the stabilizer leg 25 has been pressed against the ground. Thus, in this embodiment, the electronic control device 72 is configured to establish that the stabilizer leg 25 is in the active supporting position if it is established by the electronic control device 72 that the first measuring value V1 is higher than a given threshold value. Thus, also in this case a measuring value V1 from one single pressure sensor 70 is sufficient in order to establish whether or not the stabilizer leg 25 is in the active supporting position. However, with the layout of the hydraulic system 80 illustrated in FIG. 15, it would also be possible to use an additional second measuring value V2 from a second pressure sensor that is configured to sense the hydraulic pressure of the second chamber 35, or make the assumption that the hydraulic pressure in the second chamber 35 has a fixed low value corresponding to the valve cracking pressure of the second check valve 94b, wherein the electronic control device 72 is configured to establish that the stabilizer leg 25 is in the active supporting position if it is established by the electronic control device that the differential pressure $P_{diff}$ in the hydraulic cylinder 27 is higher than a given threshold value $V_{th}$.

The invention is of course not in any way limited to the embodiments described above. On the contrary, several possibilities to modifications thereof should be apparent to a person skilled in the art without thereby deviating from the basic idea of the invention as defined in the appended claims.

The invention claimed is:

1. A stabilizer leg arrangement comprising a support structure (20) and a stabilizer leg (25) carried by the support structure (20), the stabilizer leg (25) being provided with a hydraulic cylinder (27), by which the stabilizer leg (25) is extensible in a vertical direction in relation to the support structure (20) from a raised inactive position, in which the stabilizer leg (25) is out of contact with the ground, to an active supporting position, in which the stabilizer leg (25) is in supporting contact with the ground, wherein the hydraulic cylinder (27) comprises:
  a cylinder housing (30) having an internal space (33),
  a piston (32) movably received in said internal space (33) and configured to divide this space (33) into a first chamber (34) on a first side of the piston (32) and a second chamber (35) on an opposite second side of the piston (32), and
  a piston rod (31) fixed to the piston (32) and extending through the second chamber (35), the piston (32) being moveable in relation to the cylinder housing (30) to an advanced end position, in which the piston (32) abuts against a stop surface (40) at a lower end of the internal space (33) and in which the second chamber (35) has its minimum volume;

the stabilizer leg arrangement (2) further comprises a pressure sensor (70) configured to generate a measuring value (V1) representing the hydraulic pressure in said first chamber (34), and an electronic control device (72) connected to the pressure sensor (70), wherein the electronic control device (72) is configured to establish information whether or not the stabilizer leg (25) is in the active supporting position while taking into account said measuring value (V1);

the second chamber (35) is configured to come into fluid communication with the first chamber (34) through at least one flow channel (41; 41'; 41") in the hydraulic cylinder (27) when the piston (32) reaches the advanced end position or is on the verge of reaching this end position; and the piston (32) is configured to keep the second chamber (35) fluidly separated from the first chamber (34) when the piston is in any other position in relation to the cylinder housing (30).

2. A stabilizer leg arrangement according to claim 1, wherein said flow channel (41) extends through the piston (32), the piston (32) is provided with a valve member (42), which is moveable between a closed position, in which the valve member (42) is configured to prevent fluid flow through the flow channel (41), and an open position, in which the valve member (42) is configured to allow fluid flow through the flow channel (41), and the valve member (42) is configured to be automatically moved to the open position when the piston (32) reaches or is on the verge of reaching the advanced end position.

3. A stabilizer leg arrangement according to claim 2, wherein the valve member (42) is moveable from the closed position to the open position against the action of a spring member (43) and from the open position to the closed position by the action of the spring member (43).

4. A stabilizer leg arrangement according to claim 3, wherein the valve member (42) comprises:
  a head part (44), which is configured to be in fluid-tight contact with a valve seat (45) when the valve member (42) is in the closed position and thereby prevent fluid flow through the flow channel (41); and
  an elongated stem part (46), which is fixed to the head part (44) and extends through said flow channel (41), wherein the stem part (46) is configured to come into contact with a stop (47) at the lower end of the internal space (33) when the piston (32) is on the verge of reaching the advanced end position to thereby push the head part (44) away from the valve seat (45).

5. A stabilizer leg arrangement according to claim 4, wherein the first and second chambers (34, 35) of the hydraulic cylinder (27) are connected to a directional control valve (83) of a hydraulic system (80) included in the stabilizer leg arrangement (2), the hydraulic system (80) comprising a hydraulic fluid reservoir (81) and a pump (82) for pumping hydraulic fluid from the reservoir (81) to a pressure port (P) of the directional control valve (83), and the directional control valve (83) has a return port (R) connected to the reservoir (81), the directional control valve (83) being provided with a valve spool (88), which is moveable between:
  a first working position, in which the pressure port (P) is connected to the first chamber (34) and the return port (R) is connected to the second chamber (35),
  a second working position, in which the pressure port (P) is connected to the second chamber (35) and the return port (R) is connected to the first chamber (34), and
  a normal position, in which the pressure port (P) is disconnected from the first and second chambers (34, 35).

6. A stabilizer leg arrangement according to claim 3, wherein the first and second chambers (34, 35) of the hydraulic cylinder (27) are connected to a directional control valve (83) of a hydraulic system (80) included in the stabilizer leg arrangement (2), the hydraulic system (80) comprising a hydraulic fluid reservoir (81) and a pump (82) for pumping hydraulic fluid from the reservoir (81) to a pressure port (P) of the directional control valve (83), and the directional control valve (83) has a return port (R) connected to the reservoir (81), the directional control valve (83) being provided with a valve spool (88), which is moveable between:
  a first working position, in which the pressure port (P) is connected to the first chamber (34) and the return port (R) is connected to the second chamber (35),
  a second working position, in which the pressure port (P) is connected to the second chamber (35) and the return port (R) is connected to the first chamber (34), and
  a normal position, in which the pressure port (P) is disconnected from the first and second chambers (34, 35).

7. A stabilizer leg arrangement according to claim 2, wherein the valve member (42) comprises:
  a head part (44), which is configured to be in fluid-tight contact with a valve seat (45) when the valve member (42) is in the closed position and thereby prevent fluid flow through the flow channel (41); and
  an elongated stem part (46), which is fixed to the head part (44) and extends through said flow channel (41), wherein the stem part (46) is configured to come into contact with a stop (47) at the lower end of the internal space (33) when the piston (32) is on the verge of reaching the advanced end position to thereby push the head part (44) away from the valve seat (45).

8. A stabilizer leg arrangement according to claim 7, wherein the first and second chambers (34, 35) of the hydraulic cylinder (27) are connected to a directional control valve (83) of a hydraulic system (80) included in the stabilizer leg arrangement (2), the hydraulic system (80) comprising a hydraulic fluid reservoir (81) and a pump (82) for pumping hydraulic fluid from the reservoir (81) to a pressure port (P) of the directional control valve (83), and the directional control valve (83) has a return port (R) connected to the reservoir (81), the directional control valve (83) being provided with a valve spool (88), which is moveable between:

a first working position, in which the pressure port (P) is connected to the first chamber (34) and the return port (R) is connected to the second chamber (35), a second working position, in which the pressure port (P) is connected to the second chamber (35) and the return port (R) is connected to the first chamber (34), and a normal position, in which the pressure port (P) is disconnected from the first and second chambers (34, 35).

9. A stabilizer leg arrangement according to claim 2, wherein the first and second chambers (34, 35) of the hydraulic cylinder (27) are connected to a directional control valve (83) of a hydraulic system (80) included in the stabilizer leg arrangement (2), the hydraulic system (80) comprising a hydraulic fluid reservoir (81) and a pump (82) for pumping hydraulic fluid from the reservoir (81) to a pressure port (P) of the directional control valve (83), and the directional control valve (83) has a return port (R) connected to the reservoir (81), the directional control valve (83) being provided with a valve spool (88), which is moveable between:

a first working position, in which the pressure port (P) is connected to the first chamber (34) and the return port (R) is connected to the second chamber (35), a second working position, in which the pressure port (P) is connected to the second chamber (35) and the return port (R) is connected to the first chamber (34), and a normal position, in which the pressure port (P) is disconnected from the first and second chambers (34, 35).

10. A stabilizer leg arrangement according to claim 1, wherein said flow channel (41') is formed as an axial groove in an inner wall (38) of the cylinder housing (30).

11. A stabilizer leg arrangement according to claim 10, wherein the first and second chambers (34, 35) of the hydraulic cylinder (27) are connected to a directional control valve (83) of a hydraulic system (80) included in the stabilizer leg arrangement (2), the hydraulic system (80) comprising a hydraulic fluid reservoir (81) and a pump (82) for pumping hydraulic fluid from the reservoir (81) to a pressure port (P) of the directional control valve (83), and the directional control valve (83) has a return port (R) connected to the reservoir (81), the directional control valve (83) being provided with a valve spool (88), which is moveable between:

a first working position, in which the pressure port (P) is connected to the first chamber (34) and the return port (R) is connected to the second chamber (35), a second working position, in which the pressure port (P) is connected to the second chamber (35) and the return port (R) is connected to the first chamber (34), and a normal position, in which the pressure port (P) is disconnected from the first and second chambers (34, 35).

12. A stabilizer leg arrangement according to claim 1, wherein the first and second chambers (34, 35) of the hydraulic cylinder (27) are connected to a directional control valve (83) of a hydraulic system (80) included in the stabilizer leg arrangement (2), the hydraulic system (80) comprising a hydraulic fluid reservoir (81) and a pump (82) for pumping hydraulic fluid from the reservoir (81) to a pressure port (P) of the directional control valve (83), and the directional control valve (83) has a return port (R) connected to the reservoir (81), the directional control valve (83) being provided with a valve spool (88), which is moveable between:

a first working position, in which the pressure port (P) is connected to the first chamber (34) and the return port (R) is connected to the second chamber (35), a second working position, in which the pressure port (P) is connected to the second chamber (35) and the return port (R) is connected to the first chamber (34), and a normal position, in which the pressure port (P) is disconnected from the first and second chambers (34, 35).

13. A stabilizer leg arrangement according to claim 12, wherein the second chamber (35) is disconnected from the reservoir (81) in the normal position of the valve spool (88);

the stabilizer leg arrangement (2) comprises another pressure sensor (71) configured to generate a measuring value (V2) representing the hydraulic pressure in the second chamber (35); and the electronic control device (72) is configured to establish that the stabilizer leg (25) is in the active supporting position if it is established by the electronic control device the following conditions are simultaneously fulfilled:

the differential pressure (Pdiff) in the hydraulic cylinder (27) is higher than a given threshold value (Vth), and the measuring value (V1) representing the hydraulic pressure in the first chamber (34) differs from the measuring value (V2) representing the hydraulic pressure in the second chamber (35).

14. A stabilizer leg arrangement according to claim 12, wherein the return port (R) of the directional control valve (83) is disconnected from the second chamber (35) in the normal position of the valve spool (88);

that the hydraulic system comprises a bypass line (90) configured to form a connection between the second chamber (35) and the reservoir, and a control valve (91) arranged in the bypass line (90), wherein the control valve (91) is shiftable between a closed position, in which the control valve (91) is configured to prevent fluid flow through the bypass line (90), and an open position, in which the second chamber (35) is in fluid communication with the reservoir (81) through the bypass line (90); and the electronic control device (72) is configured to control the control valve (91) to assume the open position at the moment when the electronic control device (72) establishes the information whether or not the stabilizer leg (25) is in the active supporting position.

15. A stabilizer leg arrangement according to claim 12, wherein the return port (R) of the directional control valve (83) is connected to the second chamber (35) in the normal position of the valve spool (88).

16. A mobile working machine with a chassis (5), wherein the mobile working machine (1) comprises a stabilizer leg arrangement (2) according to claim 1, and the support structure (20) of the stabilizer leg arrangement (2) is connected to the chassis (5).

17. A mobile working machine according to claim 16, wherein the mobile working machine (1) comprises a hydraulic crane (4) mounted to the chassis (5).

18. A method for detecting whether or not a stabilizer leg (25) is in an active supporting position in supporting contact with the ground, the stabilizer leg (25) being extensible in a vertical direction in relation to a support structure (20) by hydraulic cylinder (27) from a raised inactive position, in which the stabilizer leg (25) is out of contact with ground, to said active supporting position, said hydraulic cylinder (27) comprising:

a cylinder housing (30) having an internal space (33), a piston (32) movably received in said internal space (33) and configured to divide this space (33) into a first chamber (34) on a first side of the piston (32) and a second chamber (35) on an opposite second side of the piston (32), and a piston rod (31) fixed to the piston (32) and extending through the second chamber (35), the piston (32) being moveable in relation to the cylinder housing (30) to an advanced end position, in which the piston (32) abuts against a stop surface (40) at a lower end of the internal space (33) and in which the second chamber (35) has its minimum volume;

wherein:

a pressure sensor (70) generates a measuring value (V1) representing the hydraulic pressure in said first chamber (34);

the second chamber (35) is made to come into fluid communication with the first chamber (34) through at least one flow channel (41; 41'; 41") in the hydraulic cylinder (27) when the piston (32) reaches the advanced end position or is on the verge of reaching this end position, the piston (32) keeping the second chamber (35) fluidly separated from the first chamber (34) when the piston (32) is in any other position in relation to the cylinder housing (30); and information s to whether or not the stabilizer leg (25) is in the active supporting position is established by an electronic control device (72) while taking into account said measuring value (V1).

19. A method according to claim 18, wherein the electronic control device (72), at the moment when it establishes information whether or not the stabilizer leg (25) is in the active supporting position, controls a control valve (91) in a line (90) between the second chamber (35) and a hydraulic fluid reservoir (81) to assume an open position to thereby bring the second chamber (35) into fluid communication with the reservoir (81) through this line (90).

20. A method according to claim 18, wherein another pressure sensor (71) generates a measuring value (V2) representing the hydraulic pressure in said second chamber (35); that the electronic control device (72) establishes the magnitude of the differential pressure (Pdiff) in the hydraulic cylinder (27) based on said measuring values (V1, V2); and the electronic control device (72) establishes that the stabilizer leg (25) is in the active supporting position if the following conditions are simultaneously fulfilled:

the differential pressure (Pdiff) in the hydraulic cylinder (27) is higher than a given threshold value (Vth), and the measuring value (V1) representing the hydraulic pressure in the first chamber (34) differs from the measuring value (V2) representing the hydraulic pressure in the second chamber (35).

* * * * *